(12) United States Patent
Bernard et al.

(10) Patent No.: US 7,236,930 B2
(45) Date of Patent: Jun. 26, 2007

(54) METHOD TO EXTEND OPERATING RANGE OF JOINT ADDITIVE AND CONVOLUTIVE COMPENSATING ALGORITHMS

(75) Inventors: Alexis P. Bernard, Palisades, CA (US); Yifan Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 620 days.

(21) Appl. No.: 10/822,319

(22) Filed: Apr. 12, 2004

(65) Prior Publication Data

US 2005/0228669 A1    Oct. 13, 2005

(51) Int. Cl.
*G10L 15/10* (2006.01)
(52) U.S. Cl. .................. 704/233; 704/226
(58) Field of Classification Search ............... 704/233, 704/234, 226, 256
See application file for complete search history.

(56) References Cited

U.S. PATENT DOCUMENTS 7,062,433 B2 *   6/2006  Gong ................. 704/226
7,165,028 B2 *   1/2007  Gong ................. 704/233

OTHER PUBLICATIONS

Zhao, Yunxin; An EM Algorithm for Linear Distortion Channel Estimation Based on Observations from a Mixture of Gaussian Sources; Speech and Audio Processing, IEEE Transaction on; vol. 7, Issue 4, pp. 400-413; Jul. 1999.*

* cited by examiner

*Primary Examiner*—Abul K. Azad
(74) *Attorney, Agent, or Firm*—W. James Brady; Frederick J. Telecky, Jr.

(57) ABSTRACT

The operating range of joint additive and convolutive compensating method is extended by enhanced channel estimation procedure that adds SNR-dependent inertia and SNR-dependent limit on the channel estimate.

12 Claims, 2 Drawing Sheets

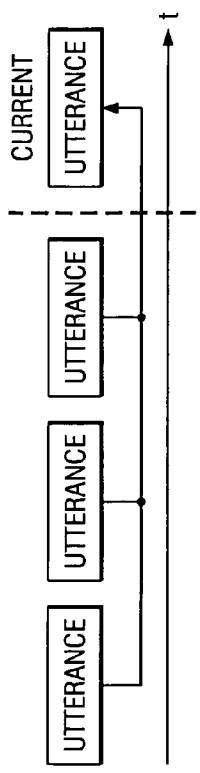
FIG. 3
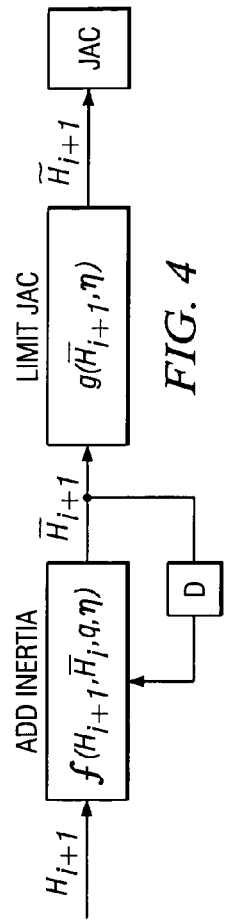
FIG. 4
| | TEST SET A | | | | | | TEST SET B | | | | | | TEST SET C | | | | | |
|---|---|---|---|---|---|---|---|---|---|---|---|---|---|---|---|---|---|---|
| | SUBWAY | BABBLE | CAR | EXHIBIT | AVERAGE | | RESTAURANT | STREET | AIRPORT | STATION | AVERAGE | | SUBWAYM | STREETM | AVERAGE | | AVERAGE |
| 20 dB | 99.11 | 98.76 | 99.08 | 99.07 | 99.01% | | 99.03 | 98.73 | 99.25 | 99.29 | 99.08% | | 99.08 | 98.61 | 98.85% | | 99.00% |
| 15 dB | 98.74 | 98.19 | 98.66 | 98.40 | 98.50% | | 97.76 | 97.94 | 97.98 | 98.70 | 98.10% | | 98.53 | 98.07 | 98.30% | | 98.30% |
| 10 dB | 97.42 | 95.47 | 97.44 | 96.79 | 96.78% | | 94.88 | 95.62 | 95.59 | 96.79 | 95.72% | | 97.36 | 95.65 | 96.51% | | 96.30% |
| 5 dB | 93.37 | 88.57 | 94.39 | 90.81 | 91.79% | | 88.12 | 90.08 | 90.25 | 91.27 | 89.93% | | 93.21 | 90.66 | 91.94% | | 91.07% |
| 0 dB | 81.30 | 65.90 | 80.05 | 76.98 | 76.06% | | 68.50 | 73.25 | 75.66 | 74.45 | 72.97% | | 78.45 | 71.80 | 75.13% | | 74.63% |
| AVERAGE | 93.99 | 89.38 | 93.92 | 92.41 | 92.43% | | 89.66 | 91.12 | 91.75 | 92.10 | 91.16% | | 93.33 | 90.96 | 92.14% | | 91.86% |
FIG. 5

METHOD TO EXTEND OPERATING RANGE OF JOINT ADDITIVE AND CONVOLUTIVE COMPENSATING ALGORITHMS

FIELD OF INVENTION

This invention relates to speech recognition and more particularly to joint additive acoustic noise and convolutive channel noise compensating algorithms for speech recognition.

BACKGROUND OF INVENTION

A speech recognizer trained on clean speech data and operating in different environments has lower performance due to at least the two distortion sources of background noise and microphone or channel changes. Handling simultaneously the two is critical to the performance of the recognizer.

There are many front-end solutions that have been developed and have shown to give promising results for connected digit recognition applications in very noisy environments. See references 2 and 3. For instance, there are methods such as ETSI advanced DSR front-end that handles both channel distortion and background noise. See D. Macho, L. Mauuary, B. Noe, Y. M. Cheng, D. Ealey, D. Jouvet, H. Kelleher, D. Pearce, and F. Saadoun, "Evaluation of a Noise-robust DSR front-end on AURORA databases," Proc. Int. Conf. on Spoken Language Processing, Colorado, UAS, September 2002, pp 17–20. These techniques do not require any noise training data. To be effective in noise reduction, they typically require an accurate instantaneous estimate of the noise spectrum.

Alternate solutions consist, instead, of modifying the back-end of the recognizer to compensate for the mismatch between the training and recognition environments. More specifically, in the acoustic model space, a convolutive (e.g. channel) component and an additive (e.g. background noise) component can be introduced to model the two distortion sources. See the following references: M. Afifty, Y. Gong, and J. P. Haton, "A general joint additive and convolutive bias compensation approach applied to noisy Lombard speech recognition," IEEE Trans. On Speech and Audio Processing, vol. 6, no. 6, pp 524–538, November 1998; J. L. Gauvain, L. Lamel, M. Adda-Decker, and D. Matrouf, "Developments in continuous speech dictation using the ARPA NAB news task, " in Proc. of IEEE Int. Conf. on Acoustics, Speech and Signal Processing, Detroit, 1996, pp 73–76; Y. Minami and S. Furui, "A maximum likelihood procedure for a universal adaptation method based on HMM composition," in Proc. of IEEE Int. Conf. on Acoustics, Speech and Signal Processing, Detroit, 1995, pp 129–132; M. J. F. Gales, Model-Based Techniques for Noise Robust Speech Recognition, Ph.D. thesis, Cambridge University, U.K., 1995; Y. Gong, "A Robust continuous speech recognition system for mobile information devices (invited paper)," in Proc. Of International Workshop on Hands-Free Speech Communication, Kyoto, Japan, April 2001; and Y. Gong, "Model-space compensation of microphone and noise for speaker-independent speech recognition," in Proc. of IEEE Int. Conf. on Acoustics, Speech, and Signal Processing, Hong Kong, April 2003. The effect of the two distortions introduces in the log spectral domain non-linear parameter changes, which can be approximated by linear equations. See S. Sagayama, Y. Yamaguchi, and S. Takahashi, "Jacobian adaptation of noisy speech models," in Proc. of IEEE Automatic Speech Recognition Workshop, Santa Barbara, Calif., USA, December 1997, pp 396–403, IEEE Signal Processing Society and N. S. Kim, "Statistical linear approximation for environmental compensation, IEEE Signal Processing Letters, vol. 5, no. 1, pp 8–11, January 1998.

It is desirable to provide a more robust utilization of a framework recently developed by Texas Instruments Incorporated known as JAC (Joint compensation of Additive and Convolutive distortions). This is described in patent application Ser. No. 10/251,734; filed Sep. 20, 2002 of Yifan Gong entitled "Method of Speech Recognition Resistant to Convolutive Distortion and Additive Distortion." JAC handles simultaneously both background noise and channel distortions for speaker independent speech recognition. Joint additive acoustic noise and convolutive channel noise compensating algorithms for improved speech recognition in noise are not able to operate at very low signal to noise ratios (SNR). This application is incorporated herein by reference. The reason lies in the fact that when the compensation mechanism of the recognizer is suddenly exposed to a new type of channel noise or to a very low SNR signal, inaccurate channel estimates or insufficient background noise compensation will degrade the quality of the subsequent channel estimate, which in turn will degrade recognition accuracy and channel estimate of the next sentence exposed to the recognizer.

SUMMARY OF INVENTION

In accordance with one embodiment of the present invention a solution to this problem includes adding inertia to JAC channel estimate and to force the amplitude of the channel estimates to be made as a function of the amount of channel statistics already observed.

In accordance with an embodiment of the present invention, in addition to adding inertia to JAC channel estimate, forcing the amplitude of the channel estimates to be made as a function of the amount of channel statistics already observed (the SNR environment) and to force the channel estimate to be within a certain range.

DESCRIPTION OF DRAWING

FIG. 3 illustrates past utterances used in recognizing current utterances.

FIG. 4 is a block diagram of the environment and statistic dependent channel dependent channel estimate according to one embodiment of the present invention.

FIG. 5 is a table of performance of E-JAC back-end on the Aurora-2 database.

DESCRIPTION OF PREFERRED EMBODIMENTS OF THE PRESENT INVENTION

Figure 1:
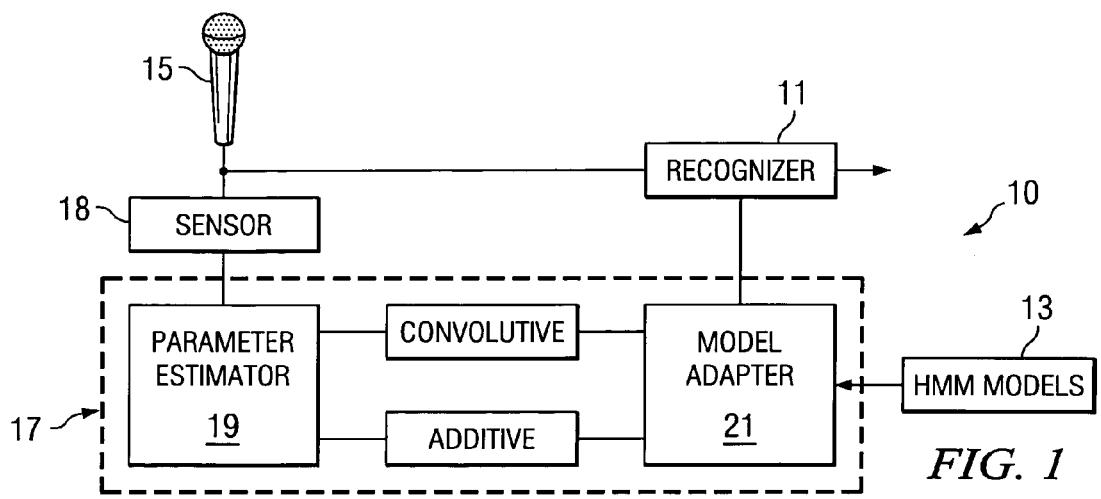
FIG. 1 illustrates a speech recognition system according to prior art JAC application.
Figure 2:
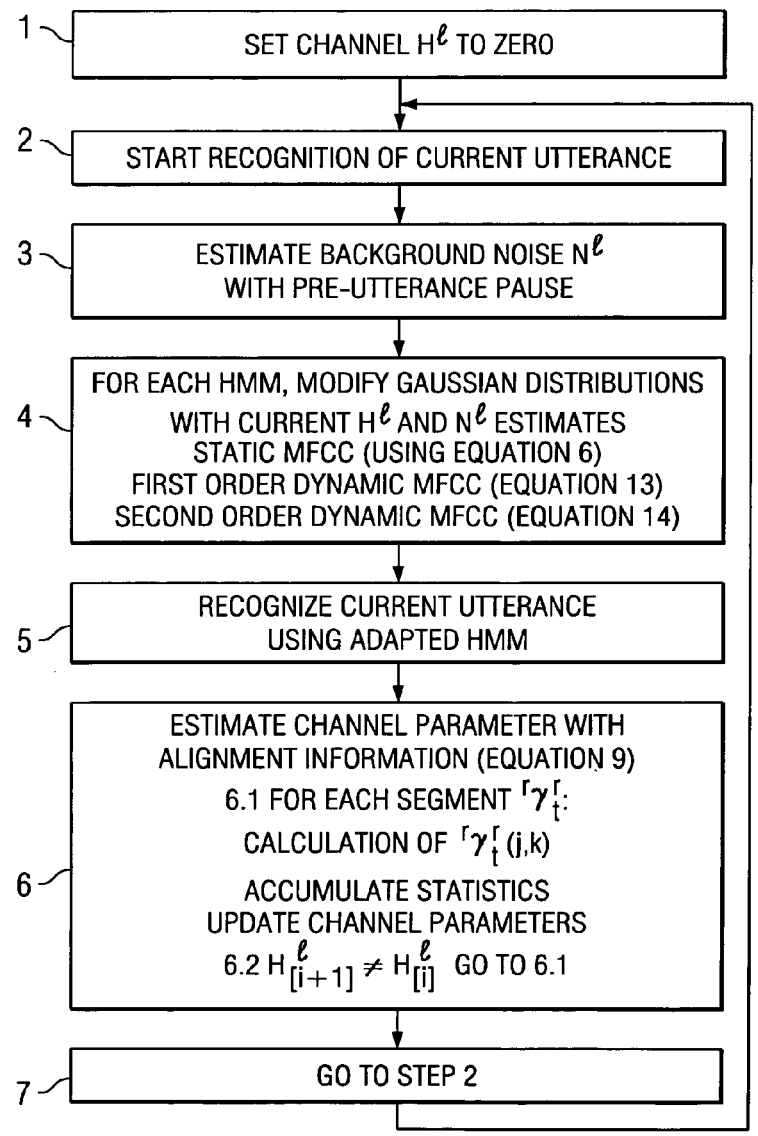
FIG. 2 is a flow chart of the operation of the processor in FIG. 1 according to prior art.

Review of a Joint Additive and Convolutive Noise Compensation (JAC) Algorithm

A speech signal x(n) can only be observed in a given acoustic environment. An acoustic environment can be modeled by a background noise b'(n) and a distortion channel h(n). For typical mobile speech recognition, b'(n) consists, for instance, of office noise, vehicle engine or road noise, and h(n) consists of the microphone type or its relative position to the speaker. Let y(n) be the speech observed in the environment involving b'(n) and h(n): y(n)=(x(n)+b'(n))*h(n). In typical speech recognition applications, b'(n) can not be measured directly. What is available is b'(n) *h(n). Let b(n)=b'(n)*h(n), our model of distorted speech becomes:

$$y(n) = x(n) * h(n) + b(n). \quad (1)$$

Or, in the power spectrum domain, $$Y(k) = X(k)H(k) + B(k). \quad (2)$$

Representing the above quantities in logarithmic scale, we have:

$$Y^l(k) = g(X^l, H^l, B^l)(k) \quad (3)$$

$$\triangleq \log(\exp(X^l(k) + H^l(k)) + \exp(B^l(k))) \quad (4)$$

Assuming the log-normal distribution and ignoring the variance, we have in the acoustic model space, $$E[Y^l] \triangleq \hat{m}^l = g(m^l, H^l, B^l), \quad (5)$$

where $m^l$ is the original Gaussian mean vector and $\hat{m}^l$ is the Gaussian mean vector compensated for the distortions caused by channel $H^l$ and environment noise $B^l$.

Estimation of Channel and Noise Components

Our goal is to derive the Hidden Markov Models (HMMs) of Y, the speech signal under both additive noise and convolutive distortions. The key problem is to obtain an estimate of the channel $H^l$ and noise $B^l$. We assume that some speech data recorded in the noisy environment is available and that the starting HMM models for X are trained on clean speech in the feature space.

Applying the Expectation-Maximization (EM) procedure, it can be shown that $H^l$ and $B^l$ are given by the solution to the equation $$u(H^l, B^l) = \sum_{j \in \Omega_s} \sum_{k \in \Omega_m} \sum_{r=1}^{R} \sum_{t=1}^{T^r} \gamma_t^r(j, k) \cdot \quad (6)$$

$$\{g(m_{j,k}^l, H^l, B^l) - DFT(o_t^r)\}$$

$$= 0,$$

where $\gamma_t^r$ (j,k) is the probability of being in state j with mixing component k at time t given utterance r, $o_t^r$ is the observation feature vector at time t for utterance r, and DFT is the Discrete Fourier Transform. For EM procedure see A. P. Dempster, N. N. M. Laid, and D. B. Rubin, "Maximum Likelihood from incomplete data via the EM algorithm," Journal of the Royal Statistical Society, vol. 39, no. 1, pp. 1–38, 1977. For application of the procedure see above cited Y. Gong, "Model-space compensation of microphone and noise for speaker-independent speech recognition" and Y. Gong, "A method of joint compensation of additive and convolutive distortions for speaker-independent speech recognition," IEEE Trans, on Speech and Audio Processing, 2002.

Estimation of Noise Component

Equation 6 can be used to solve both $H^l$ and $B^l$. However, for this case, we assume $B^l$ to be stationary, and use the first P non-speech frames as an estimate of $B^l$. We calculate an estimate of noise in the log domain $\hat{B}^l$ as the average of the P noise frames in the log domain $$\hat{B}^l = \frac{1}{P} \sum_{t=1}^{P} DFT(y_t). \quad (7)$$

Solving Channel Equation

To solve $H^l$ for $u(H^l, B^l = \hat{B}^l) = 0$, we use Newton's method, which has interesting convergence property for on-line estimation of the parameters. The method is iterative, which gives a new estimate $H_{[i+1]}^l$, at iteration i+1, of $H^l$ using $$H_{[i+1]}^l = H_{[i]}^l - \frac{u(H_{[i]}^l, \hat{B}^l)}{u'(H_{[i]}^l, \hat{B}^l)}, \quad (8)$$

where $u'(H^l, \hat{B}^l)$ is the derivative of $u(H^l, \hat{B}^l)$ with respect to channel $H^l$. As the initial condition for Eq.8, we can set $H_{[0]}^l = 0$.

Compensation for Time Derivatives

The distortion caused by channel and noise also affects the distribution of dynamic (e.g. time derivative of) MFCC coefficients. According to definition, the compensated time derivative of cepstral coefficients $\dot{Y}^C$ is the time derivative of compensated cepstral coefficients $Y^c$. See reference above of M. J. F. Gales. It can be shown [M. J. F. Gales and Y. Gong last referenced] that both first and second order time derivatives are respectively a function of $$\eta(k) = \exp(H^l(k))\psi(k), \text{ where} \quad (9)$$

$$\psi(k) = \frac{\exp(X^l(k))}{\exp(B^l(k))}$$

is the SNR in the linear scale at the frequency bin k.

In accordance with the JAC invention the estimate comprises the channel estimated obtained from the previously recognized utterances and the noise estimate is obtained from the pre-utterance pause of the test utterance. Referring to FIG. 1 the recognizer system 10 includes a recognizer subsystem 11, Hidden Markov Models 13, a model adapter subsystem 17, a noise sensor and a microphone 15 to produce recognized speech output from the recognizer 11. The model adapter subsystem 17 includes an estimator 19 and a model adapter 21. The noise sensor 17 detects background noise during a preutterance pause. The estimator 19 estimates the background noise (additive parameters) and convolutive parameters. The convolutive and additive estimates are applied to the model adapter 21. The adapter 21 modifies the HMM models 13 and the adapted models are used for the speech recognition in the recognizer 11. The model adapter 21 includes a processor that operates on the sensed noise, performs the estimates and modifies the models from the HMM source 13.

The system recognizes utterances grouped speaker by speaker. The bias is re-estimated after recognizing each test utterance, and is initialized to zero at beginning of the recognition of all speakers.

As the recognizer does not have to wait for channel estimation, which would introduce at least a delay of the duration of the utterance; the recognition result is available as soon as the utterance is completed. The processor in the model adapter subsystem 17 operates according to the steps as follows:
1. Set channel $H^l$ to zero.
2. Start recognition of the current utterance.
3. Estimate background noise $N^l$ with pre-utterance pause.
4. For each HMM, modify Gaussian distributions with current $H^l$ and $N^l$ estimates
    4.1 Static MFCC (Equation 6)
    4.2 First order dynamic MFCC (Equation 13)
    4.3 Second order dynamic MFCC (Equation 14)
5. Recognize the current utterance using the adapted HMM
6. Estimate channel parameter with alignment information (Equation 9)
    6.1 For each segment r
        6.1.1 Calculation of $\gamma_t^r(j,k)$
        6.1.2 Accumulate statistics
        6.1.3 Update channel parameters
    6.2 $H_{[i+1]}^l \neq H_{[i]}^l$ go to 6.1
7. Go to step 2.

In step 1, the channel $H^l$ is set to zero. In step 2, the current utterance is recognized. The background noise is estimated using sensed noise during a pre-utterance pause in step 3. For each HMM modify Gaussian distribution with current channel $H^l$ and noise $N^l$ estimates by compensating static MFCC using $E\{Y^l\}\underline{\Delta}\hat{m}^l = g(m^l, H^l, B^l)$ from equation 6 where $m^l$ is the original Gaussian mean vector and $\hat{m}$ is the Gaussian mean vector compensated for the distortions caused by channel and environment noise and compensating for time derivatives by compensating first order dynamic MFCC using $$\dot{Y}^c = IDFT\left(\frac{\eta(k)}{\eta(k)+1}\dot{Y}^l\right)$$

from equation 13 and compensating second order dynamic MFCC using $$\ddot{Y}^c = IDFT\left(\frac{\eta(k)}{\eta(k)+1}\left(\frac{1}{\eta(k)+1}(\dot{Y}^l)^2 + \ddot{Y}^l\right)\right)$$

from equation 14. The compensated first order derivative of MFCC $\dot{Y}^C$ is calculated from the original first order time derivative $\dot{Y}^l$. The next step 5 is to recognize the current utterance using the modified or adapted HMM models. In step 6 is the estimation of the channel component with alignment information using an iterative method which at iteration i+1 gives a new estimate $H_{[i+1]}^l$ of $H^l$ using:

$$H_{[i+1]}^l = H_{[i]}^l - \frac{\sum_{r=1}^{R}\sum_{t=1}^{T^r}\left[\sum_{j \in \Omega s}\sum_{k \in \Omega m}\gamma_t^r(j,k)g(m_{j,k}^l, H_{[i]}^l, B^l) - DFT(o_t^r)\right]}{\sum_{r=1}^{R}\sum_{t=1}^{T^r}\sum_{j \in \Omega s}\sum_{k \in \Omega m}\gamma_t^r(j,k)h(m_{j,k}^l, H_{[i]}^l, B^l)}.$$

The operations in step 6 include for each segment of utterance r, calculating $\gamma_t^r(j,k)$ accumulating statistics and update channel parameters. $\gamma_t^r(j,k)$ is the joint probability of state j and mixing component k at time t of the utterance r, given observed speech $o_t^r$ and current model parameters, and $$h(X^l, H^l, B^l)(k) = \frac{\eta(k)}{\eta(k)+1} \text{ with}$$

$$\eta(k) = \exp(X^l(k) + H^l(k) - B^l(k)).$$

If $H_{[i+1]}^l \neq$ the final iteration of segment r $H_{[i]}^l$ then repeat the steps of the calculation, accumulate and update.

In step 7 the channel estimate repeats for the next current utterance. As illustrated in FIG. 3 the estimates of the channel and noise parameters from past utterances are used for the recognition of the current utterance. The quantities allowing the determination of optimum channel estimate and obtained during the recognition of these past utterances are carried over to the current estimate.

Extensions of the Operating Range of JAC

Introduction

While jointly estimating and compensating for additive (acoustic) and convolutive (channel) noise allows for a better recognition performance, special attention must be paid for low SNR speech signals. When the SNR is too low or the noise is highly non-stationary, it becomes difficult to make a correct noise estimate $\hat{B}^l$. In that case, the channel estimate $H_{[i+1]}^l$ will not only reflect channel mismatch but will also represent residual additive noise, erratic in nature. A solution to this problem consists of adding inertia to JAC channel estimate and to force the amplitude of channel estimates to be within a certain range, as explained hereafter.

Inertia Added to JAC Channel Estimation

At the beginning of a recognition task in a particular noise and channel condition, the recognizer may be suddenly exposed to a new type of background noise and microphone. It may be hard for the JAC algorithm to immediately give a good estimate of the channel after one utterance, since not enough statistics have been collected to represent the channel.

A solution consists of separating the running channel estimate $H^l[i+1]$ from the channel estimate $\overline{H}_{[i+1]}^l$ used for model compensation (equation 5). $\overline{H}_{[i+1]}^l$ approaches $H^l[i+1]$ gradually, as more channel statistics are collected with the increasing number q of observed utterances.

A general equation to represent how $\overline{H}_{[i+1]}^l$ can slowly converge to $H^l[i+1]$ as more data is collected is, $$\overline{H}_{[i+1]}^l = f(q, \eta, H_{[i+1]}^l, \overline{H}_{[i]}^l), \quad (10)$$

where $\eta$ is an estimate of the sentence SNR. Our preferred method of embodiment uses the following equation $$\overline{H}_{[i+1]}^l = \overline{H}_{[i]}^l + \omega(q,\eta) \cdot (H_{[i+1]}^l - \overline{H}_{[i]}^l), \quad (11)$$

where the function $\omega(q,\eta)$ is a weighting function which increases monotonically as the amount of collected channel statistics over q sentences increase. In our preferred method of embodiment, we use the following weighting function $$\omega(q, \eta) = \frac{q}{Q(\eta)}, \quad (12)$$

where $Q(\eta)$ represents an SNR-dependent integer value.

After $Q(\eta)$ utterances have been observed in a particular environment, we have sufficient statistics on the channel to allow for the channel estimate used in acoustic model compensation to be equal to the running channel estimate. As can be seen in equation 12, the function ω(q,η) increases monotonically and linearly with q to equal 1 after Q(η) sentences. If speech is clean Q is small and if not good SNR Q is larger. If Q is 1000 and there are q=100 utterances the value is heavily discounted at 0.1. If the value of q is small but SNR is good, then Q is small and the weighting function is large.

In summary, in our preferred method of embodiment, after an SNR-dependent Q(η) utterances have been recognized, we have $\overline{H}_{[i+1]}^l = H_{[i+1]}^l$. When q<Q(η), $\overline{H}_{[i+1]}^l$ is given by $$\overline{H}_{[i+1]}^l = \overline{H}_{[i]}^l + \frac{q}{Q(\eta)}(H_{[i+1]}^l - \overline{H}_{[i]}^l). \tag{13}$$

However, this is only one particular case of equation 10, which best represents the method conceptually.

Adding such inertia mainly helps when facing suddenly new noises or channel conditions, where any channel estimate, based only very few frames of observation, can be misleading and degrade subsequent recognition tasks.

Limits on JAC Channel Estimation

Despite the additional robustness provided by the new iterative procedure of equation 10, the channel estimate can still be inaccurate, especially with sudden exposure to new noise and channel conditions at low SNR. In this case, it may be beneficial to limit the amplitudes of the channel estimate that can be applied by JAC. This is done by forcing the amplitudes of the channel estimates to be within a certain range. The new channel estimate, $\tilde{H}_{[i+1]}^l$, is the one that will be used for JAC compensation.

This means mathematically that $\tilde{H}_{[i+1]}^l$ is a function of the unlimited channel estimate $\overline{H}_{[i+1]}^l$ and the sentence SNR η as follows, $$\tilde{H}_{[i+1]}^l = g(\overline{H}_{[i+1]}^l, \eta), \tag{14}$$

where the function g is monotonically increasing with $\overline{H}_{[i+1]}^l$.

In our preferred method of embodiment, we chose to limit the ranges that the JAC channel estimate can take by forcing it to be within the lower and upper limits and which are themselves functions of the sentence SNR. Equation 14 becomes then $$\tilde{H}_{[i+1]}^l = \begin{cases} \tau_{inf}(\eta) & \text{if} \quad \overline{H}_{[i+1]}^l < -\tau_{inf}(\eta) \\ \overline{H}_{[i+1]}^l & \text{if} \quad \tau_{inf}(\eta) \leq \overline{H}_{[i+1]}^l \leq \tau_{sup}(\eta) \\ \tau_{sup}(\eta) & \text{if} \quad \overline{H}_{[i+1]}^l \geq \tau_{sup}(\eta) \end{cases} \tag{15}$$

In our particular implementation, we set the range to be symmetric around 0 dB ($-\tau_{inf}=\tau_{sup}=\tau$). Equation 15 limits $\tilde{H}_{[i+1]}^l$ outside the interval $[-\tau,\tau]$, and keeps $\overline{H}_{[i+1]}^l$ unaltered when $\overline{H}_{[i+1]}^l \in [-\gamma,\gamma]$.

Such a function guarantees that $\tilde{H}_{[i+1]}^l \in [-\tau(\eta),\tau(\eta)]$. Note also that if we force τ(η)=0, we have $\overline{H}_{[0]}^l=0$, and only background noise compensation can be applied.

Such limitation on the channel estimate $\tilde{H}_{[i+1]}^l$ will prevent the running channel estimate from too severely diverging from the true channel estimate in the many cases where that would be possible, such as:

When the acoustic noise becomes too large or time-varying to be sufficiently estimated (equation 7) and compensated for, When recognition segmentation is mainly erroneous, which means that incorrect HMM models are being used in the channel estimation process, leading to rapidly growing channel estimate $\overline{H}_{[i+1]}^l$ to compensate, When the previous channel estimate is so inaccurate that the recognizer can no longer operate on and no valid surviving path is found in the Viterbi recognition algorithm, in which case JAC estimation is skipped all together.

Between the limits it is made linear and above and below the limits it is constant. The values are constant. The determination of the limits is determined by experimentation. A value may be between zero and plus and minus 3 db.

FIG. 4 illustrates the block diagram for the computation of the original running channel estimate $H_{[i+1]}^l$, the inertia-added channel estimate $\overline{H}_{[i+1]}^l$ and the range limited channel estimate $\tilde{H}_{[i+1]}^l$. The elements are added to the parameter estimator 19 in FIG. 1. The D is the delay between channel estimates (the next utterance in the embodiment).

Performance Evaluation

Experimental Conditions

The performance of the proposed Enhanced-JAC back-end algorithm (E-JAC) was evaluated on the Aurora-2 database for the purpose of benchmarking it with the new ETSI Advanced Front-End (AFE) standard. See D. Macho et al. "Evaluation of a noise-robust DSR front-end on AURORA database," in Proc. Int. Conf. on Spoken Language Processing, Colorado, USA, September 2002, pp. 17–20

The standard Aurora-2 testing procedure was used, which averages recognition performance over 10 different noise conditions (two with channel mismatch in Test C) at 5 different SNR levels (20 dB, 15 dB, 10 dB, 5 dB and 0 dB). Since the clean data and the data at −5 dB are not used in the average performance evaluation, we have not tested our algorithm at those noise levels.

As a reminder, performance of the AFE standard on the Aurora-2 database is established using the following configuration: a 39-dimensional feature vector (13 AFE features with $1^{st}$ and $2^{nd}$ order derivatives) extracted every 10 ms and 16 states word HMM models with 20 Gaussian mixtures per state. According to the official baseline for Eurospeech 2003, the average performance of the AFE standard over the entire database is 88.19%, which breaks down in the following percentages for each SNR condition, from 20 dB to 0 dB: 98.92, 97.78, 94.61, 85.99 and 63.66.

In the evaluation of our solution, we move slightly away from the feature vector being used, while keeping the HMM model topology the same. A 32-dimensional feature vector is used, which corresponds to a 16 dimensional MFCC vector and its $1^{st}$ order derivative only. For memory/benefit ratio concerns, Texas Instruments Incorporated low footprint solution typically does not use second order derivatives. While better results could be obtained by using the second order derivatives, it was decided not to use the acceleration features. Note that this means that our system operates on fewer features (about 20% less) than the AFE standard. In the experiments, a speech model variance adjustment is also applied.

Performance of E-JAC Back-End

FIG. 5 is a table that summarizes the performance of our back-end solution on the Aurora-2 database using E-JAC with 2 passes. It can be seen that we obtain an average performance level of 91.86%, which corresponds to a 31% relative improvement over AFE (88.19%). Note that such results are obtained after performing two passes of the E-JAC decoding algorithm. With only one pass, the results would be 91.47%. This indicates that most of the performance improvement and noise robustness comes from the E-JAC algorithm, and not from the two passes.

The important information to extract from the table of FIG. 5, besides the absolute results, is that the E-JAC algorithm works on every single noise condition, even at 0 dB SNR, where noise and channel energies are equal.

This was not the case for the classic JAC algorithm, which would regularly fail to operate at SNRs less or sometimes equal to 10 dB. The reason for such failure would be that residual noise after background noise compensation would interfere with channel estimation, which in turn, after acoustic model compensation, would degrade the segmentation accuracy for the next sentence and therefore the channel compensation again. If there is no progressive channel estimate being done at the beginning of an exposure to new noise and channel condition and if no limit on channel estimation can be imposed, the JAC channel estimator can rapidly diverge from the true channel estimate.

Although preferred embodiments have been described, it will be apparent to those skilled in the art that various modifications, additions, substitutions and the like can be made without departing from the spirit of the invention and these are therefore considered to be within the scope of the invention as defined in the following claims.

The invention claimed is:

1. A method of speech recognition comprising the steps of:
receiving input speech and non-speech at a microphone;
providing initial HMM models;
recognizing speech utterances one by one and performing adjustment of internal parameters for convolutive distortion and additive distortion at the same time without additional data collection, said recognizing step includes modifying mean vectors of said HMM models with current estimates compensating for static MFCC, first order dynamic MFCC and second order MFCC; and
providing a channel estimate as function of the acoustic and channel environment as well as the amount of channel data observed by adding SNR-dependent inertia to the channel estimate.

2. The method of claim 1 wherein said step of adding SNR-dependent inertia to the channel estimate includes the step of separating the running channel estimate from the channel estimate actually used for performing acoustic model compensation.

3. The method of claim 1 wherein the current channel estimate used for model compensation is a sum of the past channel estimate for model compensation and the weighted difference between the running channel estimate and the past channel estimate for model compensation.

4. The method of claim 3 wherein the weight above is proportional to the amount of utterances processed, and proportional to the signal-to-noise ratio of the current utterance.

5. The method of claim 1 including the step of carrying the quantities allowing the determination of channel estimate obtained during determination of past utterances to a current utterance.

6. A method of speech recognition comprising the steps of:
receiving input speech and non-speech at a microphone;
providing initial HMM models;
recognizing speech utterances one by one and performing adjustment of internal parameters for convolutive distortion and additive distortion at the same time without additional data collection, said recognizing step includes modifying mean vectors of said HMM models with current estimates compensating for static MFCC, first order dynamic MFCC and second order MFCC; and
providing a channel estimate as a function of the acoustic and channel environment as well as the amount of channel data observed by limiting the risk of divergence in the channel estimation by applying a SNR-dependent manipulation on the channel estimate.

7. The method of claim 6 includes forcing the estimate to be within a certain amplitude range.

8. The method of claim 7 including the step of adding SNR-dependent inertia to the channel estimate.

9. The method of claim 8 wherein said step of adding SNR-dependent inertia to the channel estimate includes the step of separating the running channel estimate from the channel estimate actually used for performing acoustic model compensation.

10. The method of claim 8 wherein the current channel estimate used for model compensation is a sum of the past channel estimate for model compensation and the weighted difference between the running channel estimate and the past channel estimate for model compensation.

11. The method of claim 10 wherein the weight above is proportional to the amount of utterances processed, and proportional to the signal-to-noise ratio of the current utterance.

12. The method of claim 6 including the step of carrying the quantities allowing the determination of channel estimate obtained during determination of past utterances to a current utterance.

* * * * *